United States Patent [19]

Patrone et al.

[11] Patent Number: 5,213,696

[45] Date of Patent: May 25, 1993

[54] AUTOMATIC DEWAXING FILTER WASHING SYSTEM AND METHOD

[75] Inventors: Anthony J. Patrone, Port Arthur; John D. Martin, Big Spring, both of Tex.; Kevin Lyon, Bakersfield, Calif.; Charles W. Harrison, Houston, Tex.

[73] Assignees: Star Enterprise, White Plains, N.Y.; Texaco Inc.

[21] Appl. No.: 811,632

[22] Filed: Dec. 23, 1991

[51] Int. Cl.[5] .................................................. B01D 35/16
[52] U.S. Cl. .................................. 210/791; 196/14.5; 208/28; 208/33; 208/DIG. 1; 210/141; 210/408; 210/409; 210/418; 210/797
[58] Field of Search .................. 196/14.5; 208/28, 33, 208/38, DIG. 1, 141; 210/141, 409, 410, 411, 784, 791, 798, 402, 403, 797, 739, 143, 408, 341, 422, 427, 418

[56] References Cited

U.S. PATENT DOCUMENTS

| | | | |
|---|---|---|---|
| 2,038,624 | 4/1936 | Adams et al. | 196/14.5 |
| 2,081,300 | 5/1937 | Hopper | 210/798 |
| 2,122,019 | 6/1938 | Adams et al. | 196/14.5 |
| 3,043,431 | 7/1962 | Dudley et al. | 210/798 |
| 3,549,514 | 12/1970 | Brown et al. | 208/33 |
| 3,666,931 | 5/1972 | Woodle | 208/311 |
| 3,718,809 | 2/1973 | Woodle | 208/33 |
| 3,972,779 | 8/1976 | Harrison | 208/33 |
| 5,137,644 | 8/1992 | Stone | 210/341 |

FOREIGN PATENT DOCUMENTS 8200029 1/1982 World Int. Prop. O. ............ 208/38

Primary Examiner—Joseph W. Drodge
Attorney, Agent, or Firm—James J. O'Loughlin; Ronald G. Gillespie

[57] ABSTRACT

The present invention is an automatic filter cleaning system which includes a solvent dewaxing filter which removes wax from a wax mix slurry and provides a filtrate. Status control apparatus is connected to the filter for affecting the operational status of the filter. Drain apparatus responsive to a control signal controls draining of the filter. Cleaning apparatus is also connected to the filter. A control network connected to the status apparatus, the draining apparatus and the cleaning apparatus controls those apparatus in a manner so as to allow selective changing of the status of the filter from an operational state to a down state to automatically drain the filter and clean the filter while the filter is in the down state.

16 Claims, 1 Drawing Sheet

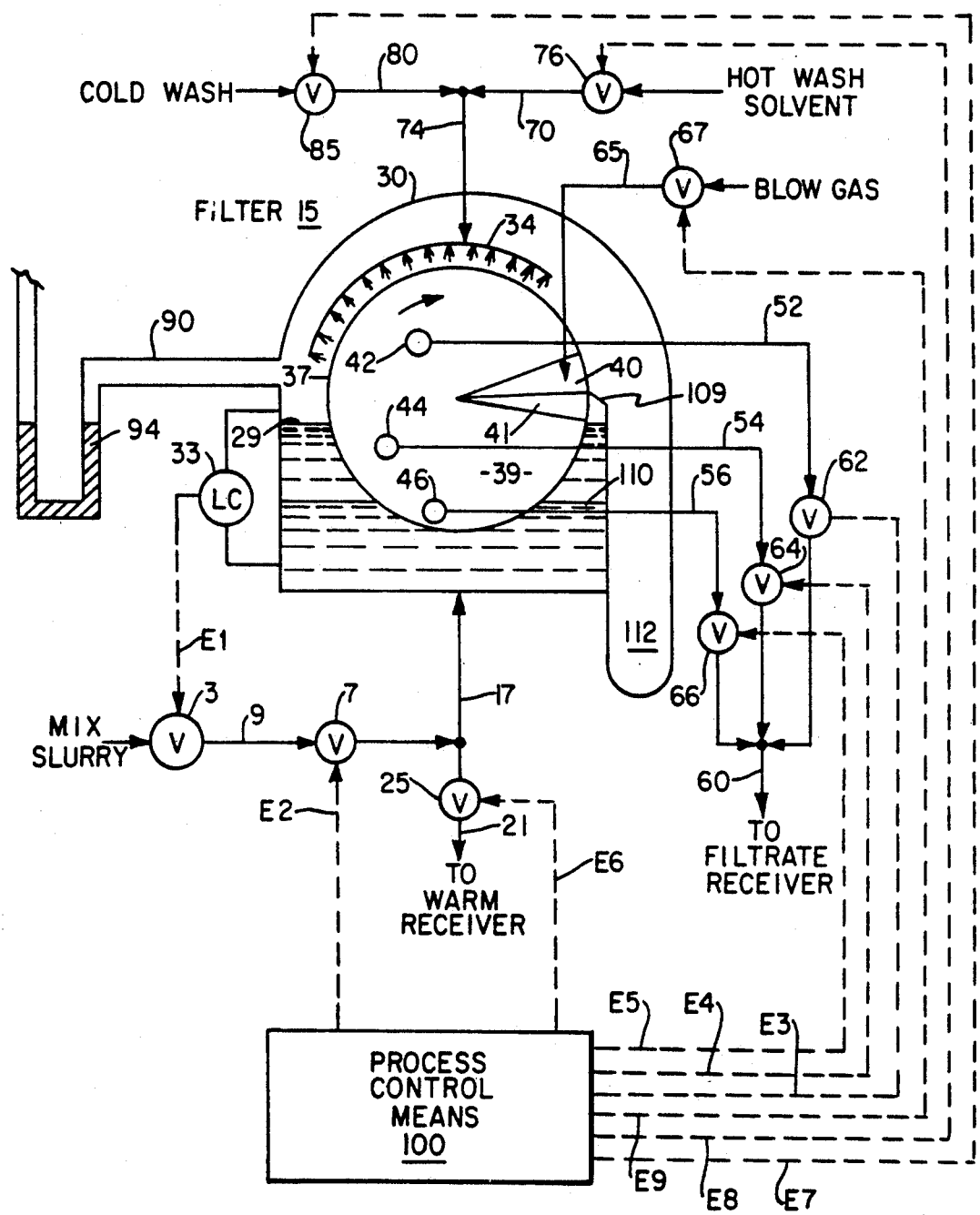

AUTOMATIC DEWAXING FILTER WASHING SYSTEM AND METHOD

BACKGROUND OF THE INVENTION

Field of the Invention

The present invention relates to an automatic washing system for a filter or filters utilized as dewaxing means in a solvent dewaxing refinery operation of the type described and disclosed in U.S. Pat. Nos. 3,666,931 and 3,718,809.

SUMMARY OF THE INVENTION

The present invention is an automatic filter cleaning system which includes a solvent dewaxing filter which removes wax from a wax, mix slurry and provides a filtrate. Status control apparatus is connected to the filter for affecting the operational status of the filter. Drain apparatus responsive to a control signal controls draining of the filter. Cleaning apparatus is also connected to the filter. A control network connected to the status apparatus, the draining apparatus and the cleaning apparatus controls those apparatus in a manner so as to automatically change the state of the filter from an operational state to a down state to drain the filter and to clean the filter while the filter is in the down state.

The objects and advantages of the invention will appear more fully hereinafter, from a consideration of the detailed description which follows, taking together with the accompanying drawing wherein one embodiment is illustrated by way of example. It is to be expressly understood, however, that the drawing is for illustrated purposes only and not to be construed as defining the limits of the invention.

BRIEF DESCRIPTION OF THE DRAWING

The FIGURE is a partial schematic and partial simplified block diagram of an automatic filter washing system constructed in accordance with the present invention.

DESCRIPTION OF THE INVENTION

In normal operation as shown in the FIGURE a wax mix slurry passes through valves 3 and 7 in line 9. The feed is provided to filter 15 by way of line 17. In typical systems, there may be only one filter 15 or there may be a bank of filters 15. Line 17 also cooperates with a line 21 having a valve 25 to drain filter 15 as hereinafter explained. The normal operating level, line 29, of the wax mix slurry in filter 15 is controlled by a conventional type level controller 33 providing a signal E1 corresponding to the level of the wax mix slurry. It should be noted that the use of level controller 33 in cooperation with valve 3 for level control already exists and is not considered part of the present invention.

Filter 15 has a hood 30, a wash header 34 for washing a drum filter 37. Drum filter 37 is internally divided into three sections 39, 40 and 41. A vacuum is maintained in section 39 to facilitate the entrance of filtrate from the wax mix slurry into section 39 in drum filter 37 also has three outlets, 42, 44 and 46, located at different levels so that at least one of them is below the level of filtrate that has passed though drum filer 39 as drum filter rotates clockwise. Outlets 42, 44 and 46 are connected to lines 52, 54 and 56, respectively, having valves 62, 64 and 66, respectively. Lines 52, 54 and 56 are commonly connected to an output line 60 which provides the filtrate to a receiver, not shown. A line 65 carries blow gas and has a valve 67. Line 65 provides the blow gas section 40 of drum filter 37. Section 41 of drum filter 37 is kept at neutral or zero pressure (i.e., it is not under a vacuum nor does it have a positive pressure).

Hot wash solvent is applied to wash header 34 by way of lines 70 and 74 with line 70 having a valve 76 for controlling the application of the hot wash solvent. Similarly, a cold wash solvent is provided to wash header 34 through lines 80 and 74, which is controlled by a valve 85 in line 80.

A line 90 connected to filter 15 is configured to provide a liquid seal 94. As such, line 90 and seal 94 effectively act as a pressure release device.

A process control means 100 controls the washing operation of filter 15 in which an operator selects a filter 15, which as noted earlier may be a single filter or may be one filter of a bank of filters, to be hot washed. The operator pushes a hot wash start push button, not shown. Process control means 100 will automatically verify that no other filter is in a hot wash cycle. It also verifies that the filter to be hot washed is in service by checking all valve positions. If the filter is not in service an alarm will be enunciated, indicating there is a valve position error.

In the normal operation, which is not part of the present invention, of Filter 15; filter drum 37 rotates and has a fabric on its circumferential surface. As the fabric passes through the wax mixing slurry in filter 15, it permits the liquid portion of the wax mix slurry to pass through at the fabric and is referred to in the present application as filtrate. Coolness of the fabric aids the wax in solidifying which adheres to the fabric. As drum filter 37 rotates, cold wash solvent washes over the fabric filter causing of the caking of wax. When the fabric passes over section 40, the blow gas assists in separating the wax from the fabric. A scraper knife 109 scrapes the loosened wax from the fabric causing the wax to fall into a repository 112 where it can be removed by workers.

As noted in preceding passage, the normal operation of filter 15 is not part of present invention, but was disclosed to clarify the relation of various elements shown in the FIGURE.

The actual hot wash sequence of the present invention starts with process control means 100 providing a signal E2 to valve 7, causing valve 7 to close. Thus, no more wax mix slurry can enter filter 15. The level of the slurry in filter 15 is allowed to drop to a low level shown by the line 110. Process control means 100 also utilizes signals E3 through E5 to control valves 62, 64 and 66, respectively to go to a closed position. The time lapse for this sequence is approximately ½ filter revolution.

Process control means 100 then provides a signal E6 to valve 25 causing it to go from a fully closed position to a fully opened position to drain the remaining level of wax mix slurry from filter 15 to a warm Wash receiver, not shown. It should be noted that blow gas valve 67 is in the normal open position and it remains open. Further, during the normal operating position, cold wash valve 85 is normally open so that the filter drum 39 is being washed by cold solvent.

Process control means 100 provides a signal E7 to close cold wash valve 85. Upon closing of cold wash valve 85, process control means 100 provides another signal E8 to hot wash valve 76 causing it go from a fully closed position to a fully opened position. The open valve 76 permits hot wash solvent to enter wash header 34 to be sprayed on drum filter 37. The hot wash solvent is allowed to flow for at least two revolutions of drum filter 37 but not more than 3 revolutions. Signal E8 then closes valve 76. The hot wash solvent removes wax filling the fabric of drum 37, thus cleaning it.

Process control means 100 then provides signal E6 to valve 25 to stop the draining of filter 15. Process control means 100 causes valve 85 to open with signal E7 and permits the cold wash to be provided to wash head 34 again.

If so desired, the operator may choose to place filter in an off-line condition instead of returning it on-line.

Thus, when filter 15 is removed from service, blow gas valve 67 is closed at this point in the sequence and valve 25 remains closed. When filter 15 is brought back into service, valve 25 and blow gas valve 67 are opened and a return to on-line service sequence starts or is continued.

The cold wash is allowed to flow into filter 15 for one to two revolutions to cool filter drum 37. Signal E6 is provided at this time to close dump valve 25. Process control means 100 then provides signal E2 to open feed valve 7. After a time interval allowed for the liquid level to rise to the filter drum 39 a signal E5 causes valve 66 to open. Then signal E4 causes valve 64 to open and pickup 44 becomes operational. Signal E3 opens valve 62 so that pickup 42 becomes operational, and that ends the filter hot wash cycle.

What is claimed is:

1. An automatic filter cleaning system comprising:
   filter means for removing wax from a wax mix slurry to provide a filtrate,
   status means connected to the filter means for affecting a status of the filter means,
   drain means connected to the filter means for draining the filter means,
   cleaning means connected to the filter means for cleaning the filter means, and
   control means connected to the status means, to the drain means and to the cleaning means for controlling the status means, the drain means and the cleaning means allowing selective changing of the status of the filter means from an operational state to a down state, and, in response to the selective changing, to automatically drain the filter means and clean the filter means while the filter means is in the down state.

2. A system as described in claim 1 in which the status means, drain means and cleaning means are responsive to control signals, and
   the control means provides control signals to the status means, the drain means and the cleaning means in such a manner so as to remove the filter means from operational service, cause the filter means to be clean and restores the filter means to service.

3. A system as described in claim 2 in which the status means includes first valve means for receiving the wax mix slurry and for passing the wax mix slurry to the filter means or for preventing the wax mix slurry from entering the filter means in accordance with a first control signal from the control means.

4. A system as described in claim 3 in which the drain means includes second valve means connected to the filter means and to the control means for being responsive to a second control signal to allow the wax mix slurry to pass out of the filter means out and to prevent the wax mix slurry from leaving the filter means in accordance with a second control signal from the control means.

5. A system as described in claim 4 in which the filter means includes:
   three outlet means at different positions within the filter means for receiving filtrate,
   three conduit means, each conduit means being connected to a corresponding outlet means, for carrying filtrate from the filter means,
   third valve means connected to a first conduit means of the three conduit means for passing or blocking the filtrate in the first conduit means in response to a third control signal from the control means,
   fourth valve means connected to a second conduit means of the three conduit means for passing or blocking the filtrate in the second conduit means in response to a fourth control signal from the control means, and
   fifth valve means connected to a third conduit means of the three conduit means for passing or blocking the flitrate in the third conduit means in accordance with a fifth control signal from the control means.

6. A system as described in claim 5 in which the cleaning means includes:
   sixth valve means receiving a cold wash solvent for responding to a sixth control signal to control flow of the cold wash solvent to the filter means in accordance with the sixth control signal, and
   seventh valve means receiving a hot wash solvent for responding to a seventh control signal to control flow of the hot wash solvent to the filter means in accordance with a seventh control signal from the control means.

7. A system as described in claim 6 in which the status means includes eighth valve means receiving blow gas for controlling flow of the blow gas to the filter means in accordance with an eighth control signal from the control means.

8. An automatic filter washing system comprising:
   filter means for filtering wax from a wax mix slurry to provide a filtrate,
   regulating means connected to the filter means for regulating the flow of the wax mix slurry to the filter means in accordance with a first control signal,
   cold wash means connected to the filter means for providing cold wash solvent to the filter means in accordance with a second control signal,
   hot wash means connected to the filter means for providing a hot wash solvent to the filter means in accordance with a third control signal,
   drain means connected to the filter means for draining the filter means in accordance with a fourth control signal,
   removal means connected to the filter means for removing filtrate from the filter means in accordance with a fifth control signal, and
   control signal means for providing the first through fifth control signals to the regulating means, to the cold wash means, to the hot wash means, to the drain means and to the removal means, respectively, so as to automatically control the washing of the filter means.

9. An automatic filter cleaning method comprising the steps of:

removing wax from a wax mix slurry with filter means to provide a filtrate, affecting a status of the filter means with status means, draining the filter means with drain means, cleaning the filter means, and controlling the status means, the drain means and the cleaning means with control means allowing selective changing of the status of the filter means from an operational state to a down state, and, in response to the selective changing, to automatically drain the filter means and clean the filter means while the filter means is in the down state.

10. A method as described in claim 9 in which the status means, drain means and Cleaning means are responsive to control signals, and the controlling step includes providing control signals to the status means, the drain means and the cleaning means in such a manner so as to remove the filter means from operational service, cause the filter means to be clean and restore the filter means to service.

11. A method as described in claim 10 in which the status step includes passing or blocking wax mix slurry to the filter means with first valve means in accordance with a first control signal from the control means.

12. A system as described in claim 10 in which the drain step includes controlling the draining of the filter means of wax mix slurry in response to a second control signal from the control means.

13. A method as described in claim 12 in which the removing steps includes:

receiving filtrate with three outlet means at different positions within the filter means, carrying filtrate from the filter means using three conduit means, each conduit means being connected to a corresponding outlet means, passing, or blocking, the filtrate in a first conduit means of the three conduit means with third valve means in response to a third control signal from the control means, passing, or blocking, the filtrate in a second conduit means of the three conduit means with fourth valve means in response to a fourth control signal from the control means, and passing or blocking the filtrate in a third conduit means of the three conduit means with fifth valve means in accordance with a fifth control signal from the control means.

14. A method as described in claim 13 in which the cleaning step includes:

controlling flow of a cold wash solvent to the filter means with sixth valve means receiving the cold wash solvent, in accordance with a sixth control signal from the control means, and controlling flow of a hot wash solvent to the filter means with seventh valve means receiving the hot wash solvent in accordance with a seventh control signal from the control means.

15. A method as described in claim 14 which the status step includes controlling flow of the blow gas to the filter means with eighth valve means receiving the blow gas in accordance with an eighth control signal from the control means.

16. An automatic filter washing method comprising the steps:

filtering wax from a wax mix slurry with filter means to provide a filtrate, regulating the flow of the wax mix slurry to the filter means with regulating means in accordance with a first control signal, providing cold wash solvent to the filter means with cold wash means in accordance with a second control signal, providing a hot wash solvent to the filter means with hot wash means in accordance with a third control signal, draining the filter means with drain means in accordance with a fourth control signal, removing filtrate from the filter means with removal means in accordance with a fifth control signal, and providing the first through fifth control signals to the regulating means, to the cold wash means, to the hot wash means, to the drain means and to the removal means, respectively, so as to automatically control the washing of the filter means.

* * * * *